United States Patent [19]

Bero et al.

[11] Patent Number: 4,537,121
[45] Date of Patent: Aug. 27, 1985

[54] APPARATUS FOR THE MANUFACTURE OF ICE CREAM SANDWICHES

[75] Inventors: Vernon L. Bero; Fredrick W. Schultz, both of Green Bay, Wis.

[73] Assignee: Gold Band Ice Cream, Inc., Green Bay, Wis.

[21] Appl. No.: 605,101

[22] Filed: Apr. 30, 1984

[51] Int. Cl.³ .......................... A21C 9/04; A21C 15/00
[52] U.S. Cl. ................................. 99/450.4; 99/450.1; 99/450.6; 426/275; 426/289
[58] Field of Search ................. 99/450.1, 450.4, 450.6; 426/275, 289

[56] References Cited

U.S. PATENT DOCUMENTS

| 3,182,611 | 5/1965 | Rubenstein | 99/450.4 |
| 3,512,485 | 5/1970 | Komberec et al. | 99/450.4 |
| 4,172,480 | 10/1979 | Ellis | 99/450.4 X |
| 4,421,019 | 12/1983 | Hocking et al. | 99/450.4 |

Primary Examiner—J. Howard Flint, Jr.
Attorney, Agent, or Firm—Andrus, Sceales, Starke & Sawall

[57] ABSTRACT

A generally imperforate conveyor belt of articulated design carries a plurality of longitudinally spaced confection carrier assemblies. Each assembly includes an outer table having peripheral guide surfaces for receiving and supporting the sandwich. The table is connected via a rotatable shaft which extends through the belt to an inner sprocket. The sprocket engages a fixed rack as the conveyor passes through a coating station to thereby rotate the sandwich, which is in the path of sprayed chips. The chips are fed from a supply hopper onto a horizontal conveyor and hence to a chute which feeds the chips into a whirling brush which sprays the chips onto the edge of the sandwich. A sandwich squeezing device is positioned upstream of the chip spray, while an air jet disposed downstream of the spray removes unwanted chips from the top cookie surface of the sandwich. The unused chips lying on the conveyor finally drop off the conveyor end and are recycled back to the supply hopper.

17 Claims, 7 Drawing Figures

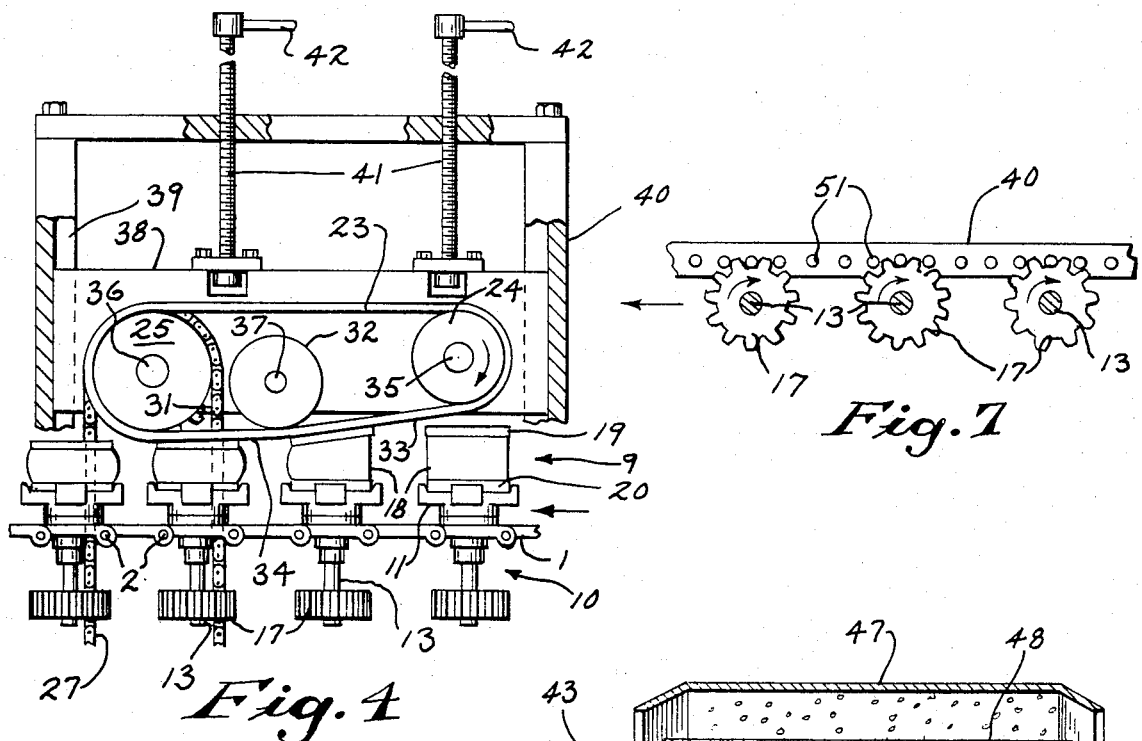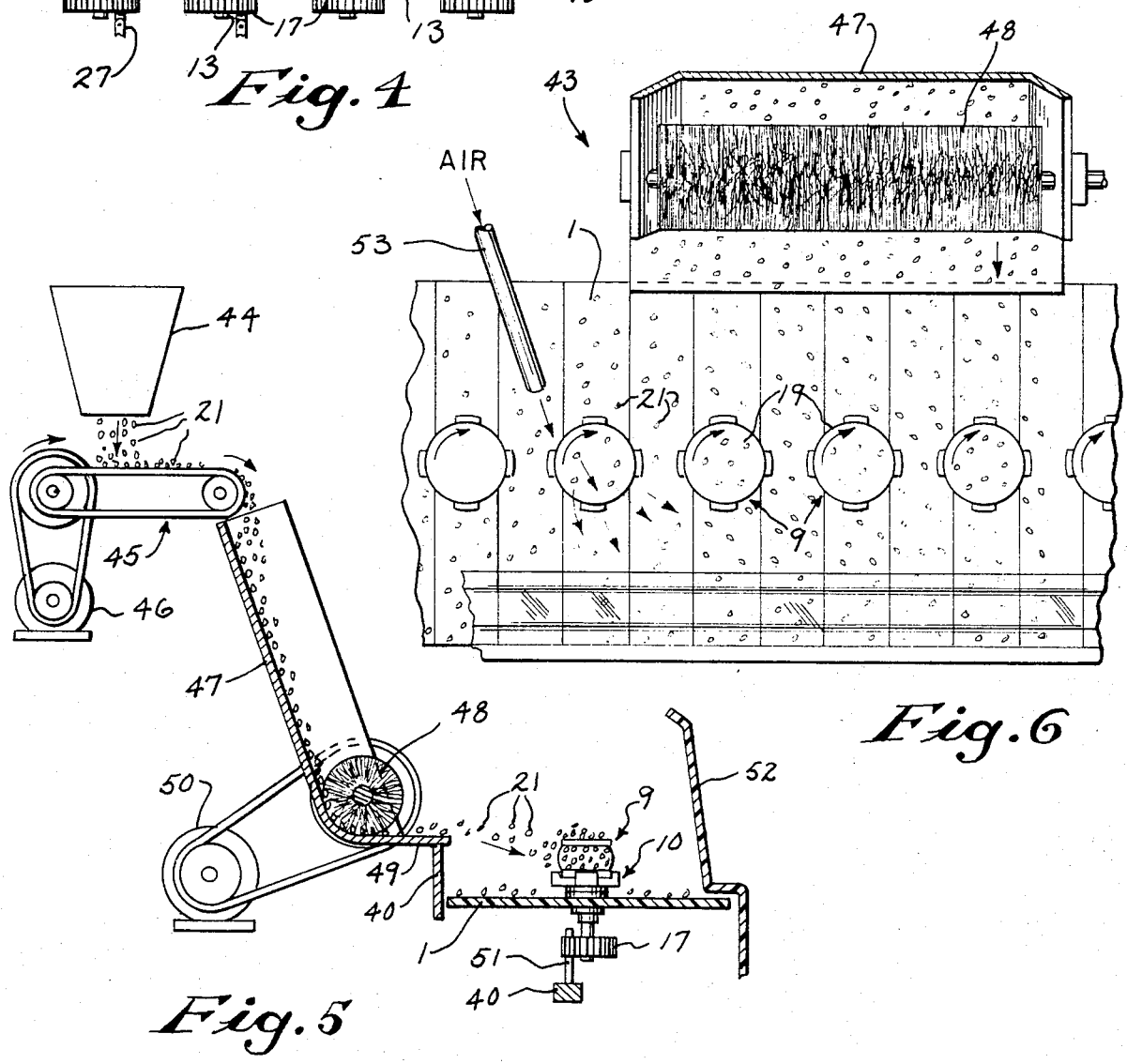

APPARATUS FOR THE MANUFACTURE OF ICE CREAM SANDWICHES

BACKGROUND AND SUMMARY OF THE INVENTION

This invention relates to the manufacture of ice cream sandwiches, especially those that are formed from a round layer of ice cream or the like sandwiched between two round cookies or the like. The exposed edge of the ice cream is coated with chips made of chocolate, nuts or the like and the entire confection tends to resemble a hamburger.

Prior ice cream sandwich making has usually been accomplished in a very rudimentary manner, although vibrating dispensers have been utilized for feeding chips toward the sandwiches for coating thereof.

It is an object of the invention to provide an essentially mechanized system for treating and coating the formed sandwiches prior to their being fed to a freezing machine.

It is a further object of the invention to provide a system which is simple and efficient and in which the sandwiches are quickly treated and coated in a unique manner.

It is yet another object to provide a system wherein excess chips are prevented from "gumming up" the machinery and are also recycled.

In accordance with the various aspects of the invention, a generally imperforate conveyor belt of articulated design carries a plurality of longitudinally spaced confection carrier assemblies. Each assembly includes an outer table having peripheral guide surfaces for receiving and supporting the sandwich. The table is connected via a rotatable shaft which extends through the belt to an inner sprocket. The sprocket engages a fixed rack as the conveyor passes through a coating station to thereby rotate the sandwich, which is in the path of sprayed chips.

The chips are fed from a supply hopper onto a horizontal conveyor and hence to a chute which feeds the chips into a whirling brush which sprays the chips onto the edge of the sandwich.

A sandwich squeezing device is positioned upstream of the chip spray, while an air jet disposed downstream of the spray removes unwanted chips from the top cookie surface of the sandwich. The unused chips lying on the conveyor finally drop off the conveyor end and are recycled back to the supply hopper.

BRIEF DESCRIPTION OF THE DRAWINGS

The accompanying drawings illustrate the best mode presently contemplated by the inventors for carrying out the invention.

In the drawings:

FIG. 4 is an enlarged side elevation of the sandwich squeezing mechanism, with parts broken away;

FIG. 5 is a vertical section taken on line 5—5 of FIG. 1 and showing the chip supply and spraying mechanism;

FIG. 6 is a plan view taken along line 6—6 of FIG. 1; and

FIG. 7 is a horizontal sectional taken on line 7—7 of FIG. 1.

DESCRIPTION OF THE PREFERRED EMBODIMENT

Figure 3:
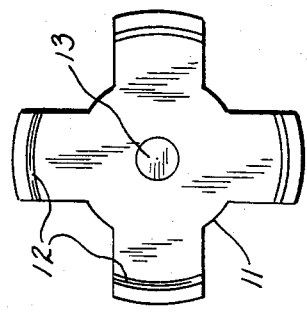
FIG. 3 is a top plan view of the carrier assembly taken on line 3—3 of FIG. 2.

As shown in the drawings, the concepts of the invention are embodied in a device having a horizontal conveyor comprising an endless belt 1 of generally imperforate construction which is articulated into a plurality of sections, as at 2. Belt 1 is trained over an idler roller 3 and drive roller 4, with the latter being driven by a motor 5 through a chain 6 and sprockets 7 and 8.

Figure 2:
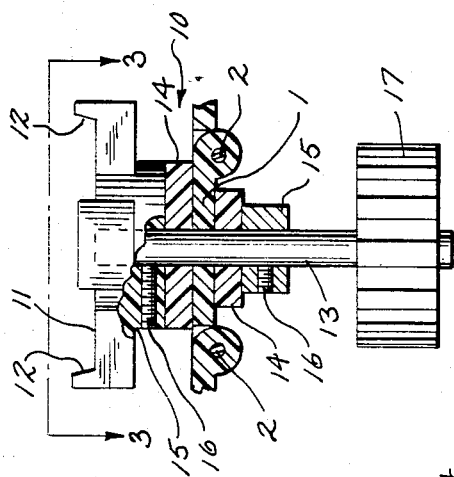
FIG. 2 is an enlarged side view of a confection carrier assembly and its mounting with parts broken away and in section.
Figure 1:
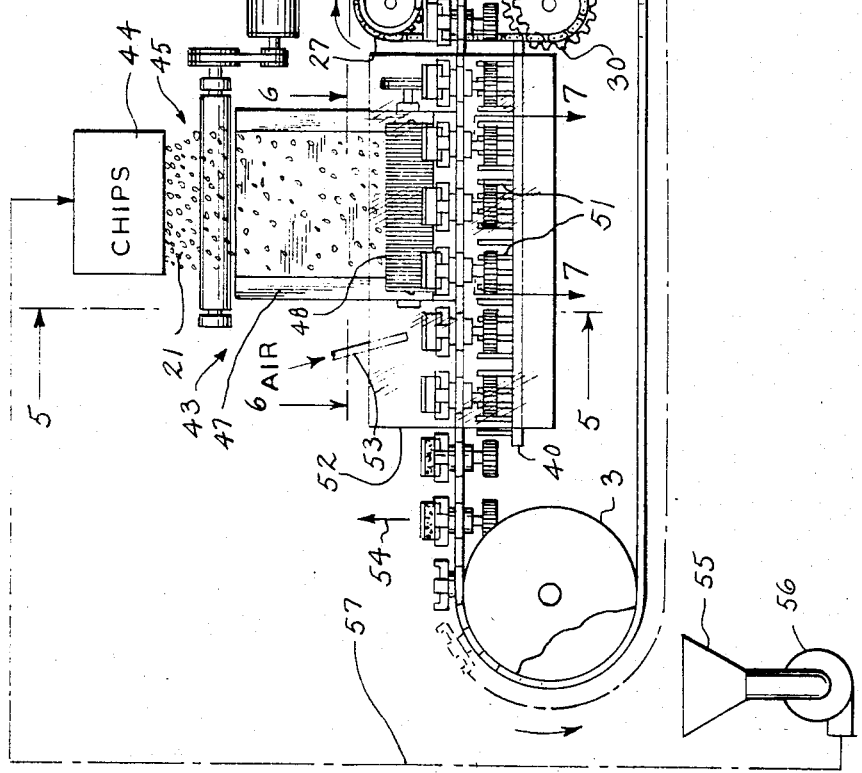
FIG. 1 is a partially schematic side elevation of a machine which incorporates the various aspects of the invention.

Means are provided on the belt to receive a plurality of ice cream sandwiches 9 thereon for traveling down the conveyor in succession. For this purpose, confection carrier assemblies 10 are mounted to successive belt sections. Referring especially to FIGS. 1–3, each carrier assembly includes an outer table 11 which in this embodiment comprises a spoked wheel having upwardly flanged radially inwardly inclined guide surfaces 12. Table 11 is fixedly mounted to an elongated shaft 13 which passes inwardly through belt 1 and is journalled for rotation in opposed bearings 14. Shaft 13 may be axially adjusted to properly fix the spacing between belt 1 and table 11, as by opposed stop members 15 having tightening screws 16 thereon. The inner end of shaft 13 fixedly carries a sprocket 17 for purposes to be described.

Each completed sandwich 9 comprises a circular layer of ice cream 18 or the like which is sandwiched between round upper and lower cookies 19 and 20 or the like. The sandwich further comprises a coating of chips 21 disposed at random on the exposed edge of ice cream 18.

The initial formation of sandwiches 9 is accomplished at the upstream end of conveyor belt 1. As shown, lower cookies 20 are first dropped onto successive carrier assemblies 10 and are guided into place onto tables 11 by surfaces 12 and held there by the surface flanges. A layer of soft ice cream 18 is then deposited onto each lower cookie 20 in any suitable well-known manner by a filling device 22. The top cookies 19 are then dropped onto the ice cream layer.

At this point, sandwiches 9 are of somewhat loose construction. Means are therefore provided to compactingly squeeze the loosely assembled sandwiches so that they are unified in thickness. For this purpose, and referring especially to FIGS. 1 and 4, a longitudinally extending generally horizontal belt 23 is disposed above conveyor belt 1 downstream of device 22, with belt 23 being trained about an idler roller 24 and a downstream spaced drive roller 25. Driver roller 25 is driven in synchronism from motor 5 and sprocket 7 by a connection including chains 26, 27 and sprockets 28–31.

Idler roller 24 is of less diameter than that of drive roller 25 and its lowermost edge is disposed in a horizontal plane which is above the lowermost edge of drive roller 25. In addition, a second idler roller 32 is disposed closely adjacent drive roller 25 upstream thereof. Roller 32 is also of less diameter than roller 25, but the lower most edges of these two rollers are in the same horizontal plane. The result is that the lower flight of belt 23 is formed with an upstream portion 33 which is inclined downwardly in a forwardly direction, and which merges into a downstream portion 34 which is horizontal.

Rollers 24, 25, 32 are mounted on respective shafts 35–37 which in turn are mounted to a slide 38 disposed in guideways 39 on the machine frame 40. Threaded shafts 41 are connected to slide 38 and extend upwardly through threaded openings in frame 40 and are provided with manually actuatable end handles 42. By turning handles 42, the exact height and inclination of belt 23 relative to belt 1 can be precisely controlled.

As the loosely-formed sandwiches 9 travel down the conveyor, top cookies 19 are initially progressively engaged from front to back by inclined belt portion 33 to likewise squeeze ice cream 18 progressively between the cookies. They are subsequently squeezed back into generally flat shape by belt portion 34. Sandwiches 9 are now ready for chip application of a station 43.

A best seen in FIGS. 1 and 5–7, station 43 includes a hopper 44 adapted to receive chips 21 and dispense them by gravity onto a generally horizontal belt conveyor 45 driven from a motor 46. The chips are discharged from conveyor 45 into the upper portion of an inclined chute 47 which carries them by gravity to a chip spraying device disposed to one side of belt 1. In the present embodiment, the spraying device comprises an elongated longitudinally extending roller brush 48 having flexible bristles and having a length greater than the sandwich diameter. Brush 48 is nested in a curved lower portion of chute 47 which merges into a horizontal lip 49 facing the conveyor, and is rotatably driven at relatively high speed from a motor 50.

As the squeezed sandwiches 9 approach and enter station 43, they are drivingly rotated. For this purpose, and as illustrated in FIGS. 1 and 7, a portion of frame 40 is provided with a fixed rack adapted to be engaged by and cause rotation about a vertical axis of longitudinally moving sprockets 17. As shown, the rack comprises a plurality of longitudinally spaced upstanding pins 51. Rotation of sprockets 17 causes tables 11 and sandwiches 9 to also rotate so that the ice cream edge of each sandwich progressively faces roller brush 48 and chute lip 49. As sandwiches 9 pass through station 43, the spinning brush whisks chips 21 onto the facing portion of the rotating sandwiches so that the chips form a randomly arranged coating which adheres to the edges of the soft ice cream.

A backstop 52 is mounted to frame 40 on the side of belt 1 opposite roller brush 48 to prevent escape of stray chips. Also, since belt 1 is imperforate, significant amounts of chips cannot fall down therethrough and onto the lower belt flight to interfere with the belt or its mountings.

Because chips 21 fly in a not fully controllable path from roller brush 48, at least some chips may undesirably fall onto upper cookie 19. Means are provided to remove these unwanted stray chips. For this purpose, and referring to FIGS. 1 and 6, an air nozzle 53 is disposed adjacent the downstream end portion of station 43 and is positioned to direct a blasting jet of pressurized air so that it impinges onto the sandwich tops to clear them of the stray chips. Nozzle 53 is supplied with air from any suitable well-known source, not shown.

The completed sandwiches 9 are then conveyed downstream of station 43 and are suitably removed at 54 for transfer to a freezing device before packaging.

At this point, a number of stray chips remain on belt 1, both from the chips spraying and air jet removal, and pneumatic means are provided to automatically recycle these chips by returning them to supply hopper 44. For this purpose, a second hopper 55 is disposed beneath the downstream end of belt 1 so that chips will fall off the belt thereinto. Hopper 55 discharges into a motor driven pneumatic blower 56 which transports the chips by air flow through a passage 57 which connects to supply hopper 44.

The concepts of the invention provide a simple, functional and yet unique way for forming and coating ice cream sandwich confections.

Various modes of carrying out the invention are contemplated as being within the scope of the following claims particularly pointing out and distinctly claiming the subject matter which is regarded as the invention.

We claim:

1. In a machine for manufacturing ice cream sandwiches, the initial components of which include a layer of ice cream or the like sandwiched between upper and lower cookies or the like, the combination comprising:
    (a) a conveyor belt having an upstream portion and a downstream portion,
    (b) motive means to drive said belt along a path,
    (c) a plurality of carrier assemblies disposed along and carried by said belt and with said assemblies being adapted to receive in succession the individual components of said sandwiches at said upstream belt portion,
    (d) drive means disposed downstream of said upstream portion of said belt to rotate said assemblies and the sandwiches thereon about a vertical axis,
    (e) spraying means disposed adjacent said belt to spray chips onto the rotating sandwiches so that chips adhere thereto,
    (f) and means disposed downstream of said chip spraying means to remove stray chips from the upper cookie of said the sprayed sandwiches.

2. The machine of claim 1 in which each of said carrier assemblies comprises:
    (a) a sandwich receiving table disposed on the outer side of said belt,
    (b) an elongated shaft having one end fixed to said table and with said shaft extending through said belt and rotatable on a vertical axis,
    (c) and a sprocket fixed to the other end of said shaft and forming part of said drive means.

3. The machine of claim 2 in which:
    (a) said table is adapted to first receive said lower sandwich cookie,
    (b) and said table is provided with peripheral flange means having cookie guiding surface means thereon.

4. The machine of claim 2 in which said drive means comprises:
    (a) said sprocket,
    (b) and a rack extending adjacent and along said belt and said chip spraying means and engageable by successive sprockets of said assemblies as they are carried downstream by said belt.

5. The machine of claim 4 in which said rack comprises a plurality of longitudinally spaced vertical pins.

6. The machine of claim 1 in which said spraying means includes a rotatable brush disposed to one side of said belt for receiving and whirlingly spraying chips onto said sandwiches.

7. The machine of claim 1 in which said spraying means comprises:
    (a) a chip holding hopper disposed above said belt,
    (b) a motively driven horizontal chip conveyor disposed beneath said hopper, (c) a chute extending from the discharge of said chip conveyor and downwardly to adjacent one side of said belt, (d) and a motively driven elongated rotatable roller brush disposed at the bottom of said chute for whirlingly spraying chips received from said chute onto the conveyed rotating sandwiches.

8. The machine of claim 7 in which said brush is of greater length than the diameter of said sandwiches.

9. The machine of claim 7 which includes means to recycle stray chips disposed adjacent said sandwiches on the downstream end portion of said conveyor belt and back for use in said chip spraying means.

10. The machine of claim 9 in which said chip recycling means comprises:
 (a) a further hopper disposed adjacent the discharge end of said conveyor belt and adapted to receive said stray chips therefrom,
 (b) a pneumatic blower connected to receive chips discharged from said further hopper,
 (c) and chip passage means connecting said blower with said first-named chip holding hopper.

11. The machine of claim 1 in which said stray chip removal means comprises a pressurized air nozzle disposed downstream of said chip spraying means and aimed so that a jet of air impinges on the said upper cookie.

12. The machine of claim 1:
 (a) in which said sandwiches are initially loosely assembled on said carrier assemblies,
 (b) and which includes sandwich squeezing means disposed upstream of said drive means for compacting loosely assembled sandwiches to make them of uniform height.

13. The machine of claim 12 in which said squeezing means comprises:
 (a) a squeezing belt disposed above said conveyor belt and driven in synchronism with the latter,
 (b) said squeezing belt having an upstream portion inclined downwardly and forwardly for progressive front-to-back engagement and squeezing of successive sandwiches,
 (c) said squeezing belt upstream portion merging into a downstream portion generally parallel with said conveyor belt for completing the squeezing action.

14. The machine of claim 13 which includes means for adjusting the height and inclination of said squeezing belt relative to said conveyor belt.

15. In a machine for manufacturing ice cream sandwiches, the initial components of which include a layer of ice cream or the like sandwiched between upper and lower cookies or the like, the combination comprising:
 (a) a conveyor belt having an upstream portion and a downstream portion,
 (b) motive means to drive said belt along a path,
 (c) a plurality of carrier assemblies disposed along and carried by said belt and with said assemblies being adapted to receive in succession the individual components of said sandwiches at said upstream belt portion, each of said assemblies including:
  (1) a sandwich receiving table disposed on the outer side of said belt,
  (2) an elongated shaft having one end fixed to said table and with said shaft extending through said belt and rotatable on a vertical axis,
  (3) and a sprocket fixed to the other end of said shaft and forming part of said drive means, (d) drive means disposed downstream of said upstream portion of said belt to rotate said assemblies and the sandwiches thereon about a vertical axis, said drive means comprising:
 (1) said sprocket,
 (2) and a rack extending adjacent and along said belt and said chip spraying means and engageable by successive sprockets of said assemblies as they are carried downstream by said belt, (e) spraying means disposed adjacent said belt to spray chips onto said rotating sandwiches so that chips adhere thereto, said spraying means comprising:
 (1) a chip holding hopper disposed above said belt,
 (2) a motively driven horizontal chip conveyor disposed beneath said hopper,
 (3) a chute extending from the discharge of said chip conveyor and downwardly to adjacent one side of said belt,
 (4) and a motively driven elongated rotatable roller brush disposed at the bottom of said chute for whirlingly spraying chips received from said chute onto the conveyed rotating sandwiches, (f) and means disposed downstream of said chip spraying means to remove stray chips from the upper cookie of said sprayed sandwiches, said stray chip removing means comprising a pressurized air nozzle disposed downstream of said chip spraying means and aimed so that a jet of air impinges on the said upper cookie.

16. The machine of claim 15:
(a) in which said sandwiches are initially loosely assembled on said carrier assemblies,
(b) and which includes sandwich squeezing means disposed upstream of said drive means for compacting loosely assembled sandwiches to make them of uniform height, said sandwich squeezing means comprising:
 (1) a squeezing belt disposed above said conveyor belt and driven in synchronism with the latter,
 (2) said squeezing belt having an upstream portion inclined downwardly and forwardly for progressive front-to-back engagement and squeezing of successive sandwiches,
 (3) said squeezing belt upstream portion merging into a downstream portion generally parallel with said conveyor belt for completing the squeezing action,
(c) and means to recycle stray chips disposed adjacent said sandwiches on the downstream end portion of said conveyor belt and back for use in said chip spraying means, said chip recycling means comprising:
 (1) a further hopper disposed adjacent the discharge end of said conveyor belt and adapted to receive said stray chips therefrom,
 (2) a pneumatic blower connected to receive chips discharged from said further hopper,
 (3) and chip passage means connecting said blower with said first-named chip holding hopper.

17. In a machine for manufacturing ice cream sandwiches, the initial components of which include a layer of ice cream or the like sandwiched between upper and lower cookies or the like, and with said ice cream having an exposed edge, the combination comprising:
(a) an endless conveyor belt having an upstream portion and a downstream portion,
(b) motive means to drive said belt along a longitudinal path, (c) a plurality of carrier assemblies disposed longitudinally along and carried by said belt and with said assemblies being adapted to loosely receive in succession the individual components of said sandwiches at said upstream belt portion,
(d) means disposed above said belt to squeeze said sandwiches in succession to unify their thickness,
(e) means disposed along said belt to rotate said carrier assemblies and the squeezed sandwiches thereon,
(f) means disposed adjacent said belt to spray chips onto said rotating sandwiches so that chips adhere to said exposed edge of said ice cream layer,
(g) means disposed adjacent said belt to remove stray chips from the upper cookie of said sprayed sandwich,
(h) and means to recycle sprayed and removed stray chips disposed on said belt and back for use in said chip spraying means.

* * * * *

UNITED STATES PATENT AND TRADEMARK OFFICE
CERTIFICATE OF CORRECTION

PATENT NO. : 4,537,121

DATED : August 27, 1985

INVENTOR(S) : VERNON L. BERO ET AL

It is certified that error appears in the above-identified patent and that said Letters Patent is hereby corrected as shown below:

Claim 1, column 4, line 31, Cancel "the" and substitute therefor --said--

Claim 1, column 4, line 35, Cancel "said the" and substitute therefor --the said--

Signed and Sealed this

Twenty-sixth Day of November 1985

[SEAL]

Attest:

DONALD J. QUIGG

Attesting Officer

Commissioner of Patents and Trademarks